United States Patent
Fritze et al.

(12)

(10) Patent No.: US 6,177,376 B1
(45) Date of Patent: Jan. 23, 2001

(54) PROCESS FOR PREPARING A METALLOCENE CATALYST SYSTEM

(75) Inventors: Cornelia Fritze, Frankfurt; Hans Bohnen, Niedernhausen; Frank Küber, Oberursel, all of (DE)

(73) Assignee: Targor GmbH (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/015,130

(22) Filed: Jan. 29, 1998

(30) Foreign Application Priority Data

Jan. 31, 1997 (DE) .............................................. 197 03 478

(51) Int. Cl.[7] .............................. B01J 31/00; B01J 37/00; C08F 4/02; C08F 4/60
(52) U.S. Cl. ......................... 502/110; 502/104; 502/121; 502/124; 502/128; 502/129; 502/132; 502/134
(58) Field of Search ..................................... 502/124, 128, 502/121, 130, 131, 132, 133, 134

(56) References Cited

U.S. PATENT DOCUMENTS

| | | | |
|---|---|---|---|
| 5,643,847 | * 7/1997 | Walzer, Jr. | 502/117 |
| 5,834,393 | * 11/1998 | Jacobsen et al. | 502/129 |
| 5,919,723 | * 7/1999 | Milani et al. | 502/134 |
| 5,948,869 | * 9/1999 | Vallieri et al. | 502/133 |
| 5,972,823 | * 10/1999 | Walzer, Jr. | 502/128 |
| 6,100,353 | * 8/2000 | Lynch et al. | 502/129 |

FOREIGN PATENT DOCUMENTS

| | | |
|---|---|---|
| 0 573 403 A2 | 6/1935 | (EP) . |
| 0 500 944 A1 | 7/1991 | (EP) . |
| WO 95/10546 | 4/1995 | (WO) . |

* cited by examiner

*Primary Examiner*—Mark L. Bell
*Assistant Examiner*—J. Pasterczyk
(74) *Attorney, Agent, or Firm*—Connolly, Bove, Lodge & Hutz LLP

(57) ABSTRACT

The present invention relates to a process for preparing a metallocene catalyst system, which comprises reacting a metallocene starting compound in a solvent with a compound capable of transferring hydrocarbon radicals and converting the resulting metallocene compound which is σ-substituted by one or more hydrocarbon radicals in solution without isolation into a polymerization-active catalyst system by means of an activator.

19 Claims, No Drawings

PROCESS FOR PREPARING A METALLOCENE CATALYST SYSTEM

The present invention relates to a process for preparing a metallocene catalyst system which is suitable for the polymerization of olefins. The intermediates formed in the process are not isolated, but are used directly in solution for further process steps.

Hydrocarbon-substituted metallocene compounds such as monoalkyl- and dialkyl- or monoaryl- and diaryl-metallocene compounds form, in combination with specific cocatalysts, active catalyst systems which are suitable for the polymerization of olefins (EP 468537, EP 427697, J. Am. Chem. Soc. 1989, 111, 2728). In addition, application of such systems to a support allows an improved polymer morphology to be achieved (EP 614468, EP 507876).

Processes known hitherto from the literature for preparing hydrocarbon-substituted metallocene catalyst systems have the disadvantage that the metallocenes first have to be isolated, as a result of which yield losses cannot be avoided. Activation of the metallocene and application of the metallocene to a support represent additional process steps.

It is therefore an object of the present invention to provide a process in which a polymerization-active hydrocarbon-substituted metallocene catalyst is prepared in a simple and economical manner.

This object is achieved by a process for preparing a metallocene catalyst system in which a metallocene starting compound is reacted in a solvent with a compound capable of transferring hydrocarbon radicals and the resulting metallocene compound which is a-substituted by one or more hydrocarbon radicals is converted in solution without isolation into a polymerization-active catalyst system by means of an activator. The catalyst system obtained in solution can be used for a polymerization process without prior isolation.

For the purposes of the present invention, the term solution or solvent also encompasses suspensions or suspension media, i.e. the starting materials used in the process of the invention and also the products obtained can be partly or completely dissolved or can be partly or completely in suspended form.

Metallocene starting compounds employed can be, for example, cyclopentadienyl complexes. These can be, for example, bridged or unbridged biscyclopentadienyl complexes as described, for example, in EP 129 368, EP 561 479, EP 545 304 or EP 576 970, monocyclopentadienyl complexes such as bridged amidocyclopentadienyl complexes which are described, for example, in EP 416 815, multinuclear cyclopentadienyl complexes as described in EP 632 063, T7-ligand-substituted tetrahydropentalenes as described in EP 659 758 or n-ligand-substituted tetrahydroindenes as described in EP 661 300.

Preferred metallocene starting compounds are unbridged or bridged metallocene compounds of the formula I,

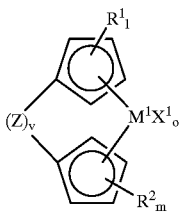

(I)

where $M^1$ is a metal of transition group 3, 4, 5 or 6 of the Periodic Table of the Elements, in particular Ti, Zr or Hf, $R^1$ are identical or different and are each a hydrogen atom or $SiR_3^3$, where $R^3$ are identical or different and are each a hydrogen atom or a $C_1$–$C_{40}$— group such as $C_1$–$C_{20}$-alkyl, $C_1$–$C_{10}$-fluoroalkyl, $C_1$–$C_{10}$-alkoxy, $C_6$–$C_{20}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or $R^1$ is a $C_1$–$C_{30}$- group such as $C_1$–$C_{25}$-alkyl, e.g. methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl such as pyridyl, furyl or quinolyl, $C_7$–$C_{30}$-arylalkyl, $C_7$–$C_{30}$-alkylaryl, fluorine-containing $C_1$–$C_{25}$-alkyl, fluorine-containing $C_6$–$C_{24}$-aryl, fluorine-containing $C_7$–$C_{30}$-arylalkyl, fluorine-containing $C_7$–$C_{30}$-alkylaryl or $C_1$–$C_{12}$-alkoxy, or two or more radicals $R^1$ can be connected to one another in such a way that the radicals $R^1$ and the atoms of the cyclopentadienyl ring which connect them form a $C_4$–$C_{24}$-ring system which in turn may be substituted, $R^2$ are identical or different and are each a hydrogen atom or $SiR_3^3$, where $R^3$ are identical or different and are each a hydrogen atom or a $C_1$–$C_{40}$-group such as $C_1$–$C_{20}$-alkyl, $C_1$–$C_{10}$-fluoroalkyl, $C_1$–$C_{10}$-alkoxy, $C_6$–$C_{14}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or $R^2$ is a $C_1$–$C_{30}$-group such as $C_1$–$C_{25}$-alkyl, e.g. methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl, e.g. pyridyl, furyl or quinolyl, $C_7$–$C_{30}$-arylalkyl, $C_7$–$C_{30}$-alkylaryl, fluorine-containing $C_1$–$C_{25}$-alkyl, fluorine-containing $C_6$–$C_{24}$-aryl, fluorine-containing $C_7$–$C_{30}$-arylalkyl, fluorine-containing $C_7$–$C_{30}$-alkylaryl or $C_1$–$C_{12}$-alkoxy, or two or more radicals $R^2$ can be connected to one another in such a way that the radicals $R^2$ and the atoms of the cyclopentadienyl ring which connect them form a $C_4$–$C_{24}$-ring system which in turn may be substituted, l is 5 when v=0, and l is 4 when v=1, m is 5 when v=0, and m is 4 when v=1, $X^1$ can be identical or different and are each a hydrogen atom, a halogen atom or $OR^6$, $SR^6$, $OSiR_3^6$, $SiR_3^6$, $PR_2^6$ or $NR_2^6$, where $R^6$ is a halogen atom, a $C_1$–$C_{10}$ alkyl group, a halogenated $C_1$–$C_{10}$ alkyl group, a $C_6$–$C_{20}$- aryl group or a halogenated $C_6$–$C_{20}$-aryl group, or $X^1$ is a toluenesulfonyl, trifluoroacetyl, trifluoroacetoxyl, trifluoromethanesulfonyl, nonafluorobutanesulfonyl or 2,2,2-trifluoroethanesulfonyl group, preferably a halogen atom, o is an integer from 1 to 4, preferably 2, Z is a bridging structural element between the two cyclopentadienyl rings and v is 0 or 1.

Examples of Z are groups $M^2R^4R^5$, where $M^2$ is carbon, silicon, germanium or tin and $R^4$ and $R^5$ are identical or different and are each a $C_1$–$C_{20}$-hydrocarbon-containing group such as $C_1$–$C_{10}$-alkyl, $C_6$–$C_{14}$-aryl or trimethylsilyl. Z is preferably $CH_2$, $CH_2CH_2$, $CH(CH_3)CH_2$, $CH(C_4H_9)C(CH_3)_2$, $C(CH_3)_2$, $(CH_3)_2Si$, $(CH_3)_2Ge$, $(CH_3)_2Sn$, $(C_6H_5)_2Si$, $(C_6H_5)(CH_3)Si$, $(C_6H_5)_2Ge$, $(C_6H_5)_2Sn$, $(CH_2)_4Si$, $CH_2Si(CH_3)_2$, o-$C_6H_4$ or 2,2'-$(C_6H_4)_2$. It is also possible for Z together with one or more radicals $R^1$ and/or $R^2$ to form a monocyclic or polycyclic ring system.

Preference is given to chiral bridged metallocene starting compounds of the formula I, in particular those in which v is 1 and one or both cyclopentadienyl rings are substituted in such a way that they form an indenyl ring. The indenyl ring is preferably substituted, in particular in the 2; 4; 2,4,5; 2,4,6; 2,4,7 or 2,4,5,6 positions, by $C_1$–$C_{20}$-groups such as $C_1$–$C_{10}$-alkyl or $C_6$–$C_{20}$-aryl, where two or more substituents of the indenyl ring can also together form a ring system.

Chiral bridged metallocene starting compounds of the formula I can be used as racemic or pure meso compounds. However, it is also possible to use mixtures of a racemic compound and a meso compound.

Examples of metallocene starting compounds are:
dimethylsilanediylbis(indenyl)zirconium dichloride
dimethylsilanediylbis(4-naphthylindenyl)zirconium dichloride
dimethylsilanediylbis(2-methylbenzindenyl)zirconium dichloride
dimethylsilanediylbis(2-methylindenyl)zirconium dichloride
dimethylsilanediylbis(2-methyl4-(1-naphthyl)indenyl)zirconium dichloride
dimethylsilanediylbis(2-methyl4-(2-naphthyl)indenyl)zirconium dichloride
dimethylsilanediylbis(2-methyl4-phenylindenyl)zirconium dichloride
dimethylsilanediylbis(2-methyl4-t-butylindenyl)zirconium dichloride
dimethylsilanediylbis(2-methyl4-isopropylindenyl)zirconium dichloride
dimethylsilanediylbis(2-methyl4-ethylindenyl)zirconium dichloride
dimethylsilyl-bis-(indenyl)hafnium dichloride
dimethylsilanediylbis(2-methyl4-α-acenaphthindenyl)zirconium dichloride
dimethylsilanediylbis(2,4-dimethylindenyl)zirconium dichloride
dimethylsilanediylbis(2-ethylindenyl)zirconium dichloride
dimethylsilanediylbis(2-ethyl4-ethylindenyl)zirconium dichloride
dimethylsilanediylbis(2-ethyl4-phenylindenyl)zirconium dichloride
dimethylsilanediylbis(2-methyl-4,5-benzindenyl)zirconium dichloride
dimethylsilanediylbis(2-methyl-4,6 diisopropylindenyl)zirconium dichloride
dimethylsilanediylbis(2-methyl-4,5 diisopropylindenyl)zirconium dichloride
dimethylsilanediylbis(2,4,6-trimethylindenyl)zirconium dichloride
dimethylsilanediylbis(2,5,6-trimethylindenyl)zirconium dichloride
dimethylsilanediylbis(2,4,7trimethylindenyl)zirconium dichloride
dimethylsilanediylbis(2-methyl-5-isobutylindenyl)zirconium dichloride
dimethylsilanediylbis(2-methyl-5-t-butylindenyl)zirconium dichloride
methyl(phenyl)silanediylbis(2-methyl-4-phenylindenyl)zirconium dichloride
methyl(phenyl)silanediylbis(2-methyl-4,6-diisopropylindenyl)zirconium dichloride
methyl(phenyl)silanediylbis(2-methyl4-isopropylindenyl)zirconium dichloride
methyl(phenyl)silanediylbis(2-methyl4,5-benzindenyl)zirconium dichloride
methyl(phenyl)silanediylbis(2-methyl-4,5-(methylbenz)indenyl)zirconium dichloride
methyl(phenyl)silanediylbis(2-methyl-4,5-(tetramethylbenz)indenyl)-zirconium dichloride
methyl(phenyl)silanediylbis(2-methyl-4-α-acenaphthindenyl)zirconium dichloride
methyl(phenyl)silanediylbis(2-methylindenyl)zirconium dichloride
methyl(phenyl)silanediylbis(2-methyl-5-isobutylindenyl)zirconium dichloride
1,2-ethanediylbis(2-methyl-4-phenylindenyl)zirconium dichloride
1,4-butanediylbis(2-methyl-4-phenylindenyl)zirconium dichloride
1,2-ethanediylbis(2-methyl-4,6 diisopropylindenyl)zirconium dichloride
1,4-butanediylbis(2-methyl4-isopropylindenyl)zirconium dichloride
1,4-butanediylbis(2-methyl-4,5-benzindenyl)zirconium dichoride
1,2-ethanediylbis(2-methyl4,5-benzindenyl)zirconium dichloride
1,2-ethanediylbis(2,4,7-timethylindenyl)zirconium dichloride
1,2-ethanediylbis(2-methylindenyl)zirconium dichloride
1,4-butanediylbis(2-methylindenyl)zirconium dichloride
[4-($\eta^5$-cyclopentadienyl)4,6,6-trimethy($\eta^5$-4,5-tetrahydropentalene)]-dichlorozirconium
[4-($\eta^5$-3'-trimethylsilylcyclopentadienyl)-4,6,6-trimethyl($\eta^5$-4,5-tetrahydropentalene)]dichlorozirconium
[4-($\eta$5-3'-isopropylcyclopentadienyl)4,6,6-trimethyl($\eta^5$-4,5-tetrahydropentalene)]dichlorozirconium
[4-($\eta^5$-cyclopentadienyl)4,7,7-trimethyl($\eta^5$-4,5,6,7-tetrahydroindenyl)]-dichlorotitanium
[4-($\eta^5$-cyclopentadienyl)4,7,7-trimethyl($\eta^5$-4,5,6,7-tetrahydroindenyl)]-dichlorozirconium
[4-($\eta^5$-cyclopentadienyl)4,7,7-trimethyl($\eta^5$-4,5,6,7-tetrahydroindenyl)]-dichlorohafnium
[4-($\eta^5$-3'-tert-butylcyclopentadienyl)-4,7,7-trimethyl($\eta^5$-4,5,6,7-tetrahydroindenyl)]dichlorotitanium
4-($\eta^5$-3'-isopropylcyclopentadienyl)-4,7,7-trimethyl($\eta^5$-4,5,6,7-tetrahydroindenyl)]dichlorotitanium
4-($\eta^5$-3'-methylcyclopentadienyl)-4,7,7-trimethyl($\eta^5$-4,5,6,7-tetrahydroindenyl)]dichlorotitanium
4-($\eta^5$-3'-trimethylsilylcyclopentadienyl)-2-trimethylsilyl-4,7,7-trimethyl($\eta^5$-4,5,6,7-tetrahydroindenyl)]dichlorotitanium
4-($\eta^5$-3'-tert-butylcyclopentadienyl)-4,7,7-trimethyl($\eta^5$-4,5,6,7-tetrahydroindenyl)]dichlorozirconium
(tert-butylamido)(tetramethyl-$\eta^5$-cyclopentadienyl)dimethylsilyl-dichlorotitanium
(tert-butylamido)(tetramethyl-$\eta^5$-cyclopentadienyl)-1,2-ethanediyl-dichlorotitanium
(methylamido)(tetramethyl-$\eta$5-cyclopentadienyledimethylsilyldichloro-titanium
(methylamido)(tetramethyl-$\eta^5$-cyclopentadienyl)-1,2-ethanediyl-dichlorotitanium
(tert-butylamido(2,4-dimethyl-2,4-pentadien-1-yl)dimethylsilyl-dichlorotitanium
bis(cyclopentadienyl)zirconium dichloride
bis(n-butylcyclopentadienyl)zirconium dichloride
bis(1,3-dimethylcyclopentadienyl)zirconium dichloride
tetrachloro[1-[bis($\eta^5$-1H-inden-1-ylidene)methylsilyl]-3-$\eta^5$-cyclopenta-2,4-dien-1-ylidene)-3-$\eta^5$-9H-fluoren-9-ylidene)butane]dizirconium
tetrachloro[2-[bis($\eta^5$-2-methyl-1H-inden-1-ylidene)methoxysilyl]-5-($\eta^5$-2,3,4,5-tetramethylcyclopenta-2,4-dien-1-ylidene)-5-($\eta^5$-9H-fluoren-9-ylidene)hexane]dizirconium
tetrachloro[1-[bis($\eta^5$-1H-inden-1-ylidene)methylsilyl]-6-($\eta^5$-cyclopenta-2,4-dien-1-ylidene)-6-($\eta^5$-9H-fluoren-9-ylidene)-3-oxaheptane]dizirconium The compounds capable of transferring hydrocarbon radicals preferably have the formula II, $$M^2R^{20}{}_qX^1{}_r$$

where $R^{20}$ are identical or different and are each a hydrocarbon radical having 1–20 carbon atoms, e.g. $C_1$–$C_{20}$-alkyl, $C_2$–$C_{20}$-alkenyl, $C_6$–$C_{20}$-aryl or $C_7$–$C_{20}$-alkylaryl, $X^1$ are identical or different and are each a hydrogen atom, a halogen atom or $OR^6$, $SR^6$, $OSiR_3{}^6$, $SiR_3$, $PR_2{}^6$ or $NR_2{}^6$, where $R^6$ is a halogen atom, a $C_1$–$C_{10}$-alkyl group, a halogenated $C_1$–$C_{10}$-alkyl group, a $C_6$–$C_{20}$-aryl group or a halogenated $C_6$–$C_{20}$-aryl group, or $X^1$ is a toluenesulfonyl, trifluoroacetyl, trifluoroacetoxyl, trifluoromethanesulfonyl, nonafluorobutanesulfonyl or 2,2,2-trifluoroethanesulfonyl group, $M^2$ is a metal of main group 1, 2, 13 or 14 or transition group 1, 12, 3 or 4 of the Periodic Table of the Elements, q is an integer from 1 to 6, preferably from 1 to 3, and r is an integer from 0 to 6, preferably 0 or 1.

The compounds capable of transferring hydrocarbon radicals preferably contain a metal of main group 1, 2 or 13 of the Periodic Table of the Elements, particularly preferably a metal of main group 2 of the Periodic Table of the Elements.

Preferred compounds capable of transferring hydrocarbon radicals are Grignard compounds, alkylaluminum compounds, organolithium compounds, organotitanium compounds, organozinc compounds, organocopper compounds, organothallium compounds, organotin compounds and organolead compounds. Particular preference is given to trimethylaluminum, methyltrichlorotitanium, dimethyl zinc, methyllithium or Grignard compounds such as methylmagnesium halides or benzylmagnesium halides. Very particular preference is given to methylmagnesium chloride, methylmagnesium bromide, benzylmagnesium chloride, benzylmagnesium bromide and methyllithium. The metallocene compounds which are σ-substituted by one or more hydrocarbon radicals can be cyclopentadienyl complexes, e.g. bridged or unbridged biscyclopentadienyl complexes as described in EP 129 368, EP 561 479, EP 545 304 and EP 576 970, monocyclopentadienyl complexes such as bridged amidocyclopentadienyl complexes which are, for example, described in EP 416 815, multinuclear cyclopentadienyl complexes as described in EP 632 063, π-ligand-substituted tetrahydropentalenes as described in EP 659758 or π-ligand substituted tetrahydroindenes as described in EP 661 300.

Particular preference is given to unbridged and bridged metallocene compounds which are σ-substituted by one or more hydrocarbon radicals and are described by the formula III,

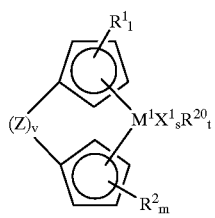

(III)

where $M^1$ is a metal of transition group 3, 4, 5 or 6 of the Periodic Table of the Elements, in particular Ti, Zr or Hf, $R^1$ are identical or different and are each a hydrogen atom or $SiR_3{}^3$, where $R^3$ are identical or different and are each a hydrogen atom or a $C_1$–$C_{40}$-group such as $C_1$–$C_{20}$-alkyl, $C_1$–$C_{10}$-fluoroalkyl, $C_1$–$C_{10}$-alkoxy, $C_6$–$C_{20}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or $R^1$ is a $C_1$–$C_{30}$- group such as $C_1$–$C_{25}$-alkyl, e.g. methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl such as pyridyl, furyl or quinolyl, $C_7$–$C_{30}$-arylalkyl, $C_7$–$C_{30}$-alkylaryl, fluorine-containing $C_1$–$C_{25}$-alkyl, fluorine-containing $C_6$–$C_{24}$-aryl, fluorine-containing $C_7$–$C_{30}$-arylalkyl, fluorine-containing $C_7$–$C_{30}$-alkylaryl or $C_1$–$C_{12}$-alkoxy, or two or more radicals $R^1$ can be connected to one another in such a way that the radicals $R^1$ and the atoms of the cyclopentadienyl ring which connect them form a $C_4$–$C_{24}$-ring system which in turn may be substituted, $R^2$ are identical or different and are each a hydrogen atom or $SiR_3{}^3$, where $R^3$ are identical or different and are each a hydrogen atom or a $C_1$–$C_{40}$-group such as $C_1$–$C_{20}$-alkyl, $C_1$–$C_{10}$-fluoroalkyl, $C_1$–$C_{10}$-alkoxy, $C_6$–$C_{14}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or $R^2$ is a $C_1$–$C_{30}$- group such as $C_1$–$C_{25}$-alkyl, e.g. methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl, e.g. pyridyl, furyl or quinolyl, $Cl_7$–$C_{30}$-arylalkyl, $C_7$–$C_{30}$-alkylaryl, fluorine-containing $C_1$–$C_{25}$-alkyl, fluorine-containing $C_6$–$C_{24}$-aryl, fluorine-containing $Cl_7$–$C_{30}$-arylalkyl, fluorine-containing $C_7$–$C_{30}$-alkylaryl or $C_1$–$C_{12}$-alkoxy, or two or more radicals $R^2$ can be connected to one another in such a way that the radicals $R^2$ and the atoms of the cyclopentadienyl ring which connect them form a $C_4$–$C_{24}$-ring system which in turn may be substituted, l is 5 when v=0, and l is 4 when v=1, m is 5 when v=0, and m is 4 when v=1, $X^1$ can be identical or different and are each a hydrogen atom, a halogen atom or $OR^6$, $SR^6$, $OSiR_3{}^6$, $SiR_3{}^6$, $PR_2{}^6$ or $NR_2{}^6$, where $R^6$ is a halogen atom, a $C_1$–$C_{10}$ alkyl group, a halogenated $C_1$–$C_{10}$-alkyl group, a $C_6$–$C_{20}$-aryl group or a halogenated $C_6$–$C_{20}$-aryl group, or $X^1$ is a toluenesulfonyl, trifluoroacetyl, trifluoroacetoxyl, trifluoromethanesulfonyl, nonafluorobutanesulfonyl or 2,2,2-trifluoroethanesulfonyl group, $R^{20}$ are identical or different and are each a hydrocarbon radical having 1–20 carbon atoms, e.g. $C_1$–$C_{20}$-alkyl, $C_2$–$C_{20}$-alkenyl, $C_6$–$C_{20}$-aryl or $C_7$–$C_{20}$-alkylaryl, s is an integer from 0 to 4, preferably 0 or 1, t is an integer from 1 to 4, preferably 1 or 2, in particular 2, and Z is a bridging structural element between the two cyclopentadienyl rings and v is 0 or 1.

Examples of Z are groups $M^2R^4R^5$, where $M^2$ is carbon, silicon, germanium or tin and $R^4$ and $R^5$ are identical or different and are each a $C_1$–$C_{20}$-hydrocarbon-containing group such as $C_1$–$C_{10}$-alkyl, $C_6$–$C_{14}$-aryl or trimethylsilyl. Z is preferably $CH_2$, $CH_2CH_2$, $CH(CH_3)CH_2$, $CH(C_4H_9)C(CH_3)_2$, $C(CH_3)_2$, $(CH_3)_2Si$, $(CH_3)_2Ge$, $(CH_3)_2Sn$, $(C_6H_5)_2Si$, $(C_6H_5)(CH_3)Si$, $(C_6H_5)_2Ge$, $(C_6H_5)_2Sn$, $(CH_2)_4Si$, $CH_2Si(CH_3)_2$, o-$C_6H_4$ or 2,2'-$(C_6H_4)_2$. It is also possible for Z together with one or more radicals $R^1$ and/or $R^2$ to form a monocyclic or polycyclic ring system.

Preference is given to chiral bridged metallocene compounds of the formula III which are σ-substituted by one or more hydrocarbon radicals, in particular those in which v is 1 and one or both cyclopentadienyl rings are substituted in such a way that they form an indenyl ring. The indenyl ring is preferably substituted, in particular in the 2; 4; 2,4,5; 2,4,6; 2,4,7 or 2,4,5,6 positions, by $C_1$–$C_{20}$-groups such as $C_1$–$C_{10}$-alkyl or $C_6$–$C_{20}$-aryl, where two or more substituents of the indenyl ring can also together form a ring system.

Examples of metallocene compounds which are σ-substituted by one or more hydrocarbon radicals are:
dimethylsilanediylbis(indenyl)dimethylzirconium
dimethylsilyl-bis-(indenyl)dimethylhafnium
dimethylsilanediylbis(4-naphthylindenyl) dimethylzirconium
dimethylsilanediylbis(2-methylbenzindenyl) dimethylzirconium
dimethylsilanediylbis(2-methylindenyl) dimethylzirconium
dimethylsilanediylbis(2-methyl-4-(1-naphthyl)indenyl) dimethylzirconium
dimethylsilanediylbis(2-methyl-4-(2-naphthyl)indenyli dimethylzirconium
dimethylsilanediylbis(2-methyl-4-phenylindenyl) dimethylzirconium
dimethylsilanediylbis(2-methyl-4-t-butylindenyl) dimethylzirconium
dimethylsilanediylbis(2-methyl-4-isopropylindenyl) dimethylzirconium
dimethylsilanediylbis(2-methyl-4-ethylindenyl) dimethylzirconium
dimethylsilanediylbis(2-methyl-4-σ-acenaphthindenyl) dimethylzirconium
dimethylsilanediylbis(2,4-dimethylindenyl) dimethylzirconium
dimethylsilanediylbis(2-ethylindenyl)dimethylzirconium
dimethylsilanediylbis(2-ethyl-4-ethylindenyl) dimethylzirconium
dimethylsilanediylbis(2-ethyl-4-phenylindenyl) dimethylzirconium
dimethylsilandiylbis(2-methyl-4,5-benzindenyl) dimethylzirconium
dimethylsilanediylbis(2-methyl-4,6 diisopropylindenyl) dimethylzirconium
dimethylsilanediylbis(2-methyl4,5 diisopropylindenyl) dimethylzirconium
dimethylsilanediylbis(2,4,6-trimethylindenyldimethyl zirconium
dimethylsilanediylbis(2,5,6-trimethylindenyl) dimethylzirconium
dimethylsilanediylbis(2,4,7-trimethylindenyl) dimethylzirconium
dimethylsilanediylbis(2-methyl-5-isobutylindenyl) dimethylzirconium
dimethylsilanediylbis(2-methyl-5t-butylindenyl) dimethylzirconium
dimethyl(phenyl)silanediylbis(2-methyl-4-phenylindenyl)dimethylzirconium
methyl(phenyl)silanediylbis(2-methyl-4,6 diisopropylindenyl)dimethylzirconium
methyl(phenyl)silanediylbis(2-methyl-4-(methylbenz) isopropyl-indenyl)dimethylzirconium
methyl(phenyl)silanediylbis(2-methyl4,5-(tetramethylbenz)indenyl)dimethylzirconium
methyl(phenyl)silanediylbis(2-methyl4α-acenaphthindenyl)dimethylzirconium
methyl(phenyl)silanediylbis(2-methylindenyl) dimethylzirconium
methyl(phenyl)silanediylbis(2-methyl-5-isobutylindenyl) dimethylzirconium
1,2-ethanediylbis(2-methyl-4-phenylindenyl) dimethylzirconium
1,4-butanediylbis(2-methyl-4-phenylindenyl) dimethylzirconium
1,2-ethanediylbis(2-methyl-4,6 diisopropylindenyl) dimethylzirconium
1,4-butanediylbis(2-methyl-4-isopropylindenyl) dimethylzirconium
1,4-butanediylbis(2-methyl-4,5-benzindenyl) dimethylzirconium
1,2-ethanediylbis(2-methyl-4,5-benzindenyl) dimethylzirconium
1,2-ethanediylbis(2,4,7-trimethylindenyl) dimethylzirconium
1,2-ethanediylbis(2-methylindenyl)dimethylzirconium
1,4-butanediylbis(2-methylindenyl)dimethylzirconium
[4-($\eta^5$-cyclopentadienyl)4,6,6-trimethyl($\eta^5$-4,5-tetrahydropentalene)]-dimethylzirconium
[4-($\eta^5$-3'-trimethylsilylcyclopentadienyl)4,6,6-trimethyl ($\eta^5$-4,5-tetrahydropentalene)]dimethylzirconium
[4-($\eta^5$-3'-isopropylcyclopentadienyl)-4,6,6-trimethyl($\eta^5$-4,5-tetrahydropentalene)]dimethylzirconium
[4-($\eta^5$-cyclopentadienyl)4,7,7-trimethyl($\eta^5$-4,5,6,7-tetrahydroindenyl)]-dimethyltitanium
[4-($\eta^5$-cyclopentadienyl)-4,7,7-trimethyl($\eta^5$-4,5,6,7-tetrahydroindenyl)]-dimethylzirconium
[4-($\eta^5$-cyclopentadienyl)-4,7,7-trimethyl($\eta^5$-4,5,6,7-tetrahydroindenyl)]-dimethylhafnium
[4-($\eta^5$-3'-tert-butylcyclopentadienyl)-4,7,7-trimethyl ($\eta^5$4,5,6,7-tetrahydroindenyl)]dimethyltitanium
4-($\eta^5$-3'-isopropylcyclopentadienyl)-4,7,7-trimethyl($\eta^5$-4,5,6,7-tetrahydroindenyl)]dimethyltitanium
4-($\eta^5$-3'-methylcyclopentadienyl)-4,7,7-trimethyl($\eta^5$-4,5,6,7-tetrahydroindenyl)]dimethyltitanium
4-($\eta^5$-3'-trimethylsilylcyclopentadienyl)-2-trimethylsilyl-4,7,7-trimethyl($\eta^5$-4,5,6,7-tetrahydroindenyl)] dimethyltitanium
4-($\eta^5$-3'-tert-butylcyclopentadienyl)-4,7,7-trimethyl($\eta^5$-4,5,6,7-tetrahydroindenyl)]dimethylzirconium
(tertbutylamido)(tetramethyl-$\eta^5$-cyclopentadienyl) dimethylsilyl-dimethyltitanium
(tertbutylamido)(tetramethyl-$\eta^5$-cyclopentadienyl)-1,2-ethanediyldichlorotitanium-dimethyltitanium
(methylamido)(tetramethyl-$\eta^5$-cyclopentadienyl) dimethylsilyldimethyltitanium
(methylamido)(tetramethyl-$\eta^5$-cyclopentadienyl-1,2-ethanediyl-dimethyltitanium
(tertbutylamido)-(2,4-dimethyl-2,4-pentadien-1-yl) dimethylsilyl-dimethyltitanium
bis(cyclopentadienyl)dimethylzirconium
bis(n-butylcyclopentadienyl)dimethylzirconium
bis(1,3-dimethylcyclopentadienyl)dimethylzirconium
tetramethyl[1-[bis($\eta^5$-1H-inden-1-ylidene)methylsilyl]-3-$\eta^5$-cyclopenta-2,4-dien-1-ylidene)-3-$\eta^5$-9H-fluoren-9-ylidene)butane]dizirconium
tetramethyl[2-[bis($\eta^5$-2-methyl-1H-inden-1-ylidene) methoxysilyl]-5($\eta^5$-2,3,4,5tetramethylcyclopenta-2,4-dien-1-ylidene)-5-($\eta^5$--9H-fluoren-9-ylidene)hexane] dizirconium
tetramethyl[1-[bis($\eta^5$--1H-inden-1-ylidene)methylsilyl]-6-($\eta^5$-cyclopenta-2,4-dien-1-ylidene)-6-($\eta^5$-9H-fluoren-9-ylidene)-3-oxaheptane]dizirconium
dimethylsilanediylbis(indenyl)chloromethylzirconium
dimethylsilanediylbis(2-methyl-4,5-benzindenyl) chloromethylzirconium
dimethylsilanediylbis(2-methyl-4-(1-naphthyl)indenyl) chloromethylzirconium
dimethylsilanediylbis(2-methyl-4-phenylindenyl) chloromethylzirconium
dimethylsilanediylbis(2-methyl-4-isopropylindenyl) chloromethylzirconium
dimethylsilanediylbis(indenyl)chlorobenzylzirconium
dimethylsilanediylbis(2-methyl-4,5-benzindenyl) chlorobenzylzirconium dimethylsilanediylbis(2-methyl-4-(1-naphthyl)indenyl)
chlorobenzylzirconium
dimethylsilanediylbis(2-methyl-4-phenylindenyl)
chlorobenzylzirconium
dimethylsilanediylbis(2-methyl-4-isopropylindenyl)
chlorobenzylzirconium
dimethylsilanediylbis(indenyl)dibenzylzirconium
dimethylsilanediylbis(2-methyl-4,5-benzindenyl)
dibenzylzirconium
dimethylsilanediylbis(2-methyl-4-(1-naphthyl)indenyl)
dibenzylzirconium
dimethylsilanediylbis(2-methyl-4-phenylindenyl)
dibenzylzirconium
dimethylsilanediylbis(2-methyl-4-isopropylindenyl)
dibenzylzirconium
[4-($\eta^5$-cyclopentadienyl)-4,6,6-trimethyl($\eta^5$-4,5-tetrahydropentalene)]-chloromethylzirconium
[4-($\eta^5$-cyclopentadienyl)-4,6,6-trimethyl($\eta^5$-4,5-tetrahydropentalene)]-chlorobenzylzirconium
[4-($\eta^5$-cyclopentadienyl)-4,6,6-trimethyl($\eta^5$-4,5-tetrahydropentalene)]-dibenzylzirconium
[4-($\eta^5$-cyclopentadienyl)-4,7,7-trimethyl($\eta^5$-4,5,6,7-tetrahydroindenyl)]-chloromethylzirconium
[4-($\eta^5$-cyclopentadienyl)-4,7,7-trimethyl($\eta^5$-4,5,6,7-tetrahydroindenyl)]-chlorobenzylzirconium
[4-($\eta^5$-cyclopentadienyl)-4,7,7-trimethyl($\eta^5$-4,5,6,7-tetrahydroindenyl)]-dibenzylzirconium
(tertbutylamino)(tetramethyl-$\eta^5$-cyclopentadienyl)
dimethylsilyl-chloromethyltitanium
(tertbutylamino)(tetramethyl-$\eta^5$-cyclopentadienyl)
dimethylsilyl-chloromethylzirconium
(tertbutylamino)(tetramethyl-$\eta^5$-cyclopentadienyl)
dimethylsilyl-chlorobenzyltitanium
(tertbutylamino)(tetramethyl-$\eta^5$-cyclopentadienyl)
dimethylsilyl-chlorobenzylzirconium
(tertbutylamino)(tetramethyl-$\eta^5$-cyclopentadienyl)
dimethylsilyldibenzyltitanium
(tertbutylamino)(tetramethyl-$\eta^5$-cyclopentadienyl)
dimethylsilyl-dibenzylzirconium
bis(1,3-dimethylcyclopentadienyl)
chloromethylzirconium
bis(1,3-dimethylcyclopentadienyl)
chlorobenzylzirconium
bis(1,3-dimethylcyclopentadienyl)dibenzylzirconium
dichlorodimethyl[1-[bis($\eta^5$-1H-inden-1-ylidene)
methylsilyl]-3-$\eta^5$-cyclopenta-2,4-dien-1-ylidene)-3-$\eta^5$-9H-fluoren-9-ylidene)butane]dizirconium dichlorodibenzyl[1-[bis($\eta^5$-1H-inden-1-ylidene)methylsilyl]-3-$\eta^5$-cyclopenta-2,4-dien-1-ylidene)-3-$\eta^5$-9H-fluoren-9-ylidene)butane] dizirconium tetrabenzyl[1-[bis($\eta^5$-1H-inden-1-ylidene) methylsilyl]-3-$\eta^5$-cyclopenta-2,4-dien-1-ylidene)-3-$\eta^5$-9H-fluoren-9-ylidene)butane]dizirconium The by-products formed in the reaction preferably have the formula IV, $M^2R^{20}_wX^1_x$ where
$R^{20}$ are identical or different and are each a hydrocarbon radical having 1–20 carbon atoms, e.g. $C_1$–$C_{20}$-alkyl, $C_2$–$C_{20}$-alkenyl, $C_6$–$C_{20}$-aryl or $C_7$–$C_{20}$-alkylaryl, $X^1$ are identical or different and are each a hydrogen atom, a halogen atom or $OR^6$, $SR^6$, $OSiR_3^6$, $SiR_3^6$, $PR_2^6$ or $NR_2^6$, where $R^6$ is a halogen atom, a $C_1$–$C_{10}$-alkyl group, a halogenated $C_1$–$C_{10}$-alkyl group, a $C_6$–$C_{20}$-aryl group or a halogenated $C_6$–$C_{20}$-aryl group, or $X^1$ is a toluenesulfonyl, trifluoroacetyl, trifluoroacetoxyl, trifluoromethanesulfonyl, nonafluorobutanesulfonyl or 2,2,2-trifluoroethanesulfonyl group, $M^2$ is a metal of main group 1, 2, 13, or 14 or transition group 1, 2, 3 or 4 of the Periodic Table of the Elements, w is an integer from 0 to 5, preferably from 0 to 2, and x is an integer from 1 to 6, preferably 1 or 2.

The transfer of the hydrocarbon radicals to the metallocene starting compound preferably precedes according to the following reaction scheme,

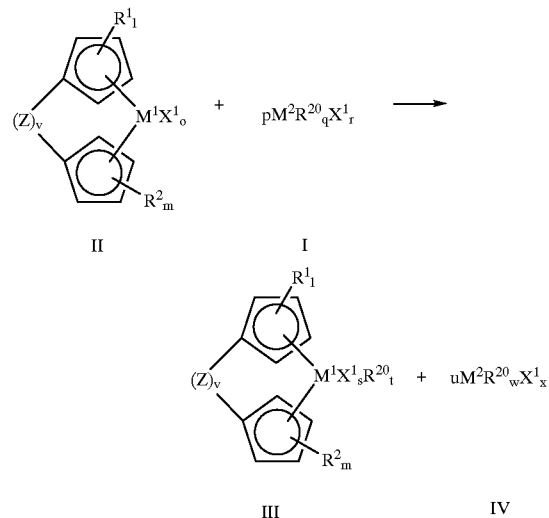

where the compounds of the formulae I, II, III and IV are as defined above and p and u are integers which indicate the stoichiometric ratios of the starting materials and products.

In the process of the invention, the metallocene starting compound is initially charged in a solvent which is preferably an organic solvent, e.g. aliphatic and/or aromatic hydrocarbons. Particular preference is given to hexane, heptane, octane, toluene and xylene. Likewise preferred are ether solvents such as diethyl ether or tetrahydrofuran. It is also possible to use solvent mixtures.

The compound capable of transferring hydrocarbon radicals can be added directly as a solution or suspension in a solvent, e.g. an organic solvent. The reaction temperature can be from −20 to +200° C. Particular preference is given to temperatures of from +20 to +100° C. The reaction time is preferably from 5 minutes to 24 hours, particularly preferably from 30 minutes to 6 hours.

The stoichiometric ratio in which the metallocene starting compound, in particular of the formula I, is reacted with a compound capable of transferring hydrocarbon radicals, in particular of the formula II, is from 1:0.1 to 1:20. Preference is given to stoichiometric ratios of from 1:0.3 to 1:2.5, depending on the desired degree of substitution by hydrocarbon radicals.

In this reaction, the metallocene compound which is σ-substituted by one or more hydrocarbon radicals is obtained as a solution and is, without being isolated, converted in a second reaction stage by means of an activator into a polymerization-active catalyst system which comprises the reaction product of the metallocene compound and the activator. In this reaction stage, the metallocene compound which is σ-substituted by one or more hydrocarbon radicals and is present in solution is, after removal of insoluble residues, reacted in solution with an activator to form a polymerization-active catalyst system. The removal of insoluble residues can be carried out, for example, by filtration. The metallocene compound which is σ-substituted by one or more hydrocarbon radicals is not isolated. As activator, it is possible to employ strong, uncharged Lewis acids, ionic compounds containing Lewis acid cations or ionic compounds containing Brönsted acids as cations. As activator, preference is given to compounds of the formula V, $$[R_jM—X_d(\!—MR_j—X_e\!)_i—MR_j]^{a-}_{\substack{|\ |\ |\\(MR_j)_g\ (MR_j)_h}}\begin{array}{c}(MR_j)_k\\|\\X_f\\\end{array}\quad bA^{c+} \quad (V)$$

where

R are, independently of one another, identical or different and are each a halogen atom or a $C_1$–$C_{40}$-group such as a $C_1$–$C_{40}$-alkyl, $C_1$–$C_{40}$-haloalkyl, $C_6$–$C_{40}$-aryl, $C_6$–$C_{40}$-haloaryl, $C_7$–$C_{40}$-arylalkyl or $C_7$–$C_{40}$-haloarylalkyl group, X are, independently of one another, identical or different and are each a $C_1$–$C_{40}$-group, e.g. a divalent carbon-containing group such as a $C_1$–$C_{40}$-alkylene, $C_1$–$C_{40}$-haloalkylene, $C_6$–$C_{40}$-arylene, $C_6$–$C_{40}$-haloarylene, $C_7$–$C_{40}$-arylalkylene or $C_7$–$C_{40}$-haloarylalkylene, $C_2$–$C_{40}$-alkynylene, $C_2$–$C_{40}$-haloalkynylene, $C_2$–$C_{40}$-alkenylene or $C_2$–$C_{40}$-haloalkenylene group or a trivalent carbon-containing group such as a $C_1$–$C_{40}$-alkanetriyl, $C_1$–$C_{40}$-haloalkanetriyl, $C_6$–$C_{40}$-arenetriyl, $C_6$–$C_{40}$-haloarenetriyl, $C_7$–$C_{40}$-arenealkanetriyl, $C_7$–$C_{40}$-haloarenealkanetriyl, $C_2$–$C_{40}$-alkynetriyl, $C_2$–$C_{40}$-haloalkynetriyl, $C_2$–$C_{40}$-alkenetriyl or $C_2$–$C_{40}$-haloalkenetriyl group, M are, independently of one another, identical or different and are each an element of group IIa, IIIa, IVa or Va of the Periodic Table of the Elements, a is an integer from 0 to 10, b is an integer from 0 to 10, c is an integer from 0 to 10 and a=b·c, d is 0 or 1, e is 0 or 1, f is 0 or 1, g is an integer from 0 to 10, h is an integer from 0 to 10, k is an integer from 0 to 10, F i is an integer from 0 to 1000, j is an integer from 1 to 6 and A is a cation from group 1, 2 or 13 of the Periodic Table of the Elements, a carbenium, oxonium or sulfonium cation or a quaternary ammonium compound.

When a=0, the compound is an uncharged chemical compound; when a≧1, the compound is a negatively charged compound containing b cations $A^{c+}$ as counterion.

If the chemical compound of the formula V contains a plurality of groups $MR_j$, these can be identical or different from one another. The number j of the radicals R in a group $MR_j$ depends on the coordination number and the oxidation state of the respective M.

The structural unit X connects the elements M to one another by means of covalent bonds. X can have a linear, cyclic or branched carbon skeleton.

R is preferably a $C_1$–$C_{40}$-hydrocarbon radical which may be halogenated, preferably perhalogenated, by halogens such as fluorine, chlorine, bromine or iodine, in particular a halogenated, in particular perhalogenated, $C_1$–$C_{30}$-alkyl group such as trifluoromethyl, pentachloroethyl, heptafluoroisopropyl or monofluoroisobutyl or a halogenated, in particular perhalogenated, $C_6$–$C_{30}$-aryl group such as pentafluorophenyl, heptachloronaphthyl, heptafluoronaphthyl, heptafluorotolyl, 3,5-bis (trifluoromethyl)phenyl, 2,4,6-tris(trifluoromethyl)phenyl or 2,2'-(octafluoro)biphenyl.

X is preferably a $C_6$–$C_{30}$-arylene group, a $C_2$–$C_{30}$-alkenylene group or a $C_2$–$C_{30}$-alkynylene group which may be halogenated, in particular perhalogenated.

It is preferred that j=1 or 2, when M is an element of group 2, j=2 or 3 when M is an element of group 13, j=3 or 4 when M is an element of group 14 and j=4 or 5 when M is an element of group 15. Particularly preferably, M is boron as an element of group 13.

i is preferably an integer from 0 to 6, particularly preferably 0 or 1.

a, b and c are preferably 0, 1 or 2.

g, h and k are preferably 0 or 1.

As A, preference is given to carbenium ions ($R_3C^+$) or quaternary ammonium ions having an acidic H function ($R_3NH^+$). Particular preference is given to quaternary ammonium salts having acidic H functions.

Examples of activators of the formula V are:

$(C_6F_5)_2B—C≡C—B(C_6F_5)_2$ $(C_6F_5)_2B—FC≡CF—B(C_6F_5)_2$

[Cyclic perfluorinated structure with $(C_6F_5)_2B$ and $B(C_6F_5)_2$ substituents]

[Perfluorophenylene bridged bis-$B(C_6F_5)_2$ structure]

[Perfluorinated benzene with multiple $B(C_6F_5)_2$ substituents]

$(C_6F_5)_2B—C≡C—SiMe_3$

[Bis-borole structure with perfluorinated aryl groups bridged by perfluorophenylene]

$(C_6F_5)_2B—C≡C—P(C_6H_5)_2$   $(C_6F_5)_2B—CF—CF—B(C_6F_5)_2$
                                                  $|\quad\quad|$
                                                  $CF_2—CF_2$

[Dibenzofuran-like structure with two B centers bearing Cl and perfluorinated rings]

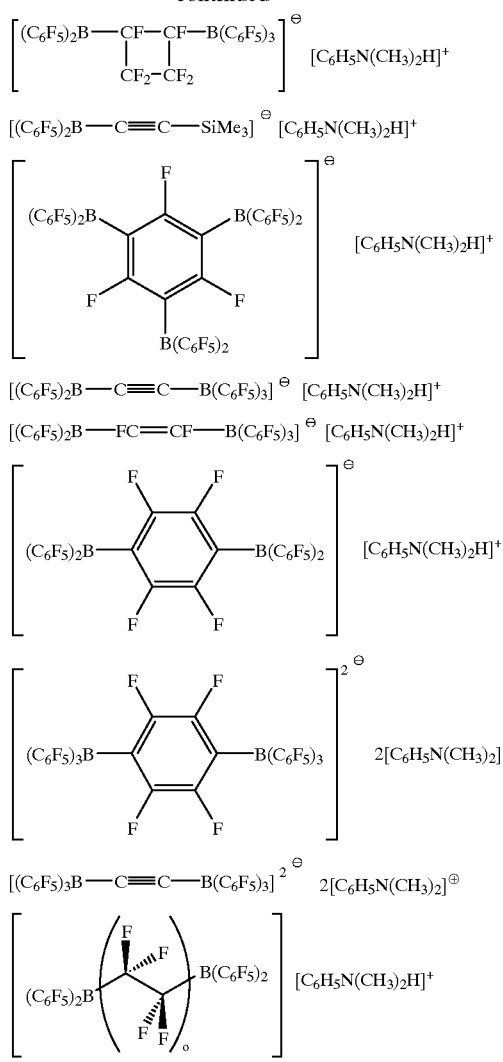

As an alternative, $CPh_3^+$ can be used as cation in place of the N,N-dimethylanilinium cation $[C_6H_5N(CH_3)_2H]^+$.

The preparation of a compound of the formula V can, for example, procede according to the following reaction scheme:

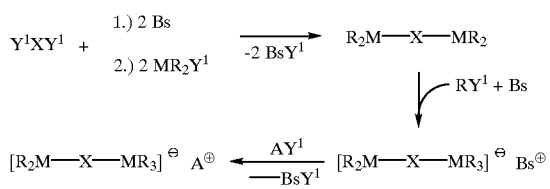

Here,

X is a $C_1$–$C_{40}$-group such as a $C_1$–$C_{40}$-alkylene, $C_1$–$C_{40}$-haloalkylene, $C_6$–$C_{40}$-arylene, $C_6$–$C_{40}$-haloarylene, $C_7$–$C_{40}$-arylalkylene or $C_7$–$C_{40}$-haloarylalkylene, $C_2$–$C_{40}$-alkynylene, $C_2$–$C_{40}$-haloalkynylene, $C_2$–$C_{40}$-alkenylene or $C_2$–$C_{40}$-haloalkenylene group, $Y^1$ are, independently of one another, identical or different and are each a leaving group, preferably a hydrogen or halogen atom, R are, independently of one another, identical or different and are each a halogen atom or a $C_1$–$C_{40}$-group such as a $C_1$–$C_{40}$-alkyl, $C_1$–$C_{40}$-haloalkyl, $C_6$–$C_{40}$-aryl, $C_6$–$C_{40}$-haloaryl, $C_7$–$C_{40}$-arylalkyl or $C_7$–$C_{40}$-haloarylalkyl group, Bs is a base, preferably an organolithium compound or a Grignard compound, M are identical or different and are each an element of group 2, 13, 14 or 15 of the Periodic Table of the Elements and A is a cation of group 1, 2 or 13 of the Periodic Table of the Elements, a carbenium, oxonium or sulfonium cation or a quaternary ammonium compound.

Likewise preferred as activator are compounds of the formula VI, $$[MR^4R_j^7]^{a-}{}_b A^{c+} \qquad (VI)$$

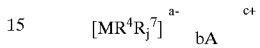

where $R^7$ are, independently of one another, identical or different and are each a halogen atom or a $C_1$–$C_{40}$-group such as a $C_1$–$C_{40}$-alkyl, $C_1$–$C_{40}$-haloalkyl, $C_6$–$C_{40}$-aryl, $C_6$–$C_{40}$-haloaryl, $C_7$–$C_{40}$-arylalkyl or $C_7$–$C_{40}$-haloarylalkyl group, $M^4$ is an element of group IIa, IIIa, IVa or Va of the Periodic Table of the Elements, j is an integer from 1 to 6, a is 0 or 1, bis 0 or 1 and c is 0 or I and a=b·c, A is a cation of group 1, 2 or 13 of the Periodic Table of the Elements, a carbenium, silylium, oxonium, sulfonium cation or a quaternary ammonium compound.

When a is 0, the compound is an uncharged compound; when a=≦1, the compound is a negatively charged compound containing b cations $A^{c+}$ as counterion.

Preference is given to compounds in which $M^4$ is boron or aluminum. $R^7$ is preferably pentafluorophenyl, p-trifluoromethylphenyl, bis(trifluoromethyl)phenyl, phenyl, o-tolyl, o,p-dimethylphenyl and m,m-dimethylphenyl.

Examples of compounds of the formula VI are:

N,N-dimethylanilinium tetrakis(pentafluorophenyl)borate
N,N-dimethylanilinium tetraphenylborate
N,N-dimethylanilinium tetrakis(o-tolyl)borate
N,N-dimethylanilinium tetrakis[bis(trifluoromethyl)phenyl]borate
N,N-dimethylanilinium tetrakis(o,p-dimethylphenyl)borate
N,N-dimethylanilinium tetrakis(m,m-dimethylphenyl)borate
N,N-dimethylanilinium tetrakis(p-trifuoromethylphenyl)borate
triphenylcarbenium tetrakis(pentafluorophenyl)borate
triphenylcarbenium tetraphenylborate
triphenylcarbenium tetrakis(o-tolyl)borate
triphenylcarbenium tetrakis[bis(tofluoromethyl)phenyl]borate
triphenylcarbenium tetrakis(o,p-dimethylphenyl) borate
triphenylcarbenium tetrakis(m,m-dimethylphenyl)borate
triphenylcarbenium tetrakis(p-trifuoromethylphenyl)borate
tris(pentafluorophenyl)borane
trimesitylborane
triphenylborane The metallocene compound which is σ-substituted by one or more hydrocarbon radicals is converted directly in solution into a catalytically active compound by reaction with an activator.

The activator can be reacted with a metallocene compound which is σ-substituted by one or more hydrocarbon radicals in a stoichiometric ratio of from 0.5:1 to 50:1. Particular preference is given to stoichiometric ratios of from 0.5:1 to 4:1. The reaction temperature can be from −20 to +200° C. Particular preference is given to temperatures of from 0 to +20° C. Solvents employed for the activator are preferably organic solvents, preferably aliphatic and/or aromatic hydrocarbons. Particular preference is given to hexane, heptane, octane, toluene and xylene. Likewise preferred are ether solvents such as diethyl ether or tetrahydrofuran. It is also possible to use solvent mixtures.

The solution comprising the polymerization-active catalyst system obtained in the process of the invention can subsequently be used directly for polymerization. The solution can also first be contacted with a support to form a supported catalyst system. Suitable support materials are, for example, silica gels, aluminum oxides, solid aluminoxane or other inorganic support materials such as magnesium chloride. Other suitable support materials are organic polymers, e.g. polyolefin powder, in finely divided form.

The activator, e.g. strong, uncharged Lewis acids, ionic compounds containing Lewis acid cations or ionic compounds containing Brönsted acids as cations, can also have been covalently bound to a support before its addition to the dissolved metallocene compound which is a-substituted by one or more hydrocarbon radicals. In this case, the metallocene compounds which are a-substituted by one or more hydrocarbon radicals are, after removal of insoluble residues, reacted directly in solution with the activator covalently fixed to a support, whereby a polymerization-active catalyst system bound to the support is formed directly in the second reaction stage.

The catalyst system prepared in the process of the invention can be used for preparing polyolefins and, for this purpose, can be metered into a polymerization vessel. Preference is given to polymerizing olefins of, for example, the formula $R^\alpha$—CH=CH—$R^\beta$, where $R^\alpha$ and $R^\beta$ are identical or different and are each a hydrogen atom, a halogen atom, an alkoxy, hydroxy, hydroxyalkyl, aldehyde, carboxylic acid or carboxylic ester group or a saturated or unsaturated hydrocarbon radical having from 1 to 20 carbon atoms, in particular from 1 to 10 carbon atoms, which can be substituted by an alkoxy, hydroxy, hydroxyalkyl, aldehyde, carboxylic acid or carboxylic ester group, or $R^\alpha$ and $R^\beta$ together with the atoms connecting them form one or more rings. Examples of such olefins are 1-olefins such as ethylene, propylene, 1-butene, 1-hexene, 4-methyl-1-pentene, 1-octene, styrene, cyclic olefins such as norbornene, vinylnorbornene, tetracyclododecene, ethylidenenorbornene, dienes such as 1,3-butadiene or 1,4-hexadiene, biscyclopentadiene or methyl methacrylate.

In particular, propylene or ethylene are homopolymerized, ethylene is copolymerized with one or more $C_3$–$C_{20}$-α-olefins, in particular propylene, and/or one or more $C_4$–$C_{20}$-dienes, in particular 1,3-butadiene, or norbornene and ethylene are copolymerized. The polymerization is preferably carried out at a temperature of from −60 to 300° C., particularly preferably from 30 to 250° C. The pressure is from 0.5 to 2500 bar, preferably from 2 to 1500 bar. The polymerization can be carried out continuously or batchwise, in one or more stages, in solution, in suspension, in the gas phase or in a supercritical medium.

The supported catalyst system can be resuspended as powder or while still moist with solvent and be metered as a suspension in an inert suspension medium into the polymerization system.

A prepolymerization can be carried out by means of the catalyst system prepared in the process of the invention. In the prepolymerization, preference is given to using the (or one of the) olefin(s) employed in the polymerization.

To prepare polyolefins having a broad molecular weight distribution, preference is given to using catalyst systems comprising two or more different metallocene compounds.

To remove catalyst poisons present in the olefin, purification using an aluminum alkyl, for example trimethylaluminum, triethylaluminum or triisobutylaluminum is advantageous. This purification can be carried out either in the polymerization system itself or the olefin is brought into contact with the Al compound and subsequently separated off again before addition to the polymerization system.

As molecular weight regulator and/or to increase the activity, hydrogen can be added if required. The total pressure in the polymerization system is from 0.5 to 2500 bar, preferably from 2 to 1500 bar. Here, the metallocene compound is employed in a concentration, based on the transition metal, of preferably from $10^{-3}$ to $10^{-8}$, particularly preferably from $10^{-4}$ to $10^{-7}$ mol, of transition metal per $dm^3$ of solvent or per $dm^3$ of reactor volume.

Before addition of the catalyst system to the reactor, another alkylaluminum compound such as trimethylaluminum, triethylaluminum, triisobutylaluminum, trioctylaluminum or isoprenylaluminum can additionally be introduced into the reactor to make the polymerization system inert (for example to remove catalyst poisons present in the olefin). This is added to the polymerization system in a concentration of from 100 to 0.01 mmol of Al per kg of reactor contents. Preference is given to using triisobutylaluminum and triethylaluminum in a concentration of from 10 to 0.1 mmol of Al per kg of reactor contents. This makes it possible to select a small Al/M molar ratio in the synthesis of a supported catalyst system.

The following examples serve to illustrate the invention.

General: Preparation and handling of the compounds were carried out with exclusion of air and moisture under argon (Schlenk technique). All solvents required were dried and freed of oxygen before use by boiling for a number of hours over suitable dessicants and subsequent distillation under argon. The compounds are characterized by means of $^1$H-NMR spectroscopy.

EXAMPLE 1

Preparation of dimethylsilylbis(2-methyl4-phenylindenyl) dimethylzirconium (Compound A)

12 g (20 mmol) of dimethylsilyl-bis(2-methyl4-phenylindenyl)zirconium dichloride are suspended in 300 ml of toluene. 28 ml of a solution of $CH_3MgBr$ (1.4M in toluene/THF) are added dropwise to the suspension over a period of 15 minutes. The reaction mixture is stirred at 70° C. for 2 hours. All insoluble constituents are subsequently filtered off hot and the residue is washed with 6×100 ml of warm toluene. The clear, yellow solution obtained is ready for direct use in further reactions.

The $^1$H-NMR spectrum of an evaporated sample displays only signals of compound A.

$^1$H-NMR in $CDCl_3$: −1.15 s (6H, Zr—CH3); 1.12 s (6H, Si—CH3); 2.10 s (6H, Cp—CH3), 6.9 s (2H, Cp); 7.0–7.7 m (16 H, C12H8)

For the activation, the solution obtained above is cooled to 0° C. and subsequently admixed with 16 g (20 mmol) of N,N-dimethylanilinium tetrakispentafluorophenylborate. The mixture is stirred for another 20 minutes and the solution is allowed to warm to room temperature, giving a clear, dark red solution.

EXAMPLE 2

Preparation of dimethylsilylbis(2-methylindenyl) dimethylzirconium (Compound B)

9.55 g (20 mmol) of dimethylsilylbis(2-methylindenyl) zirconium dichloride are suspended in 150 ml of toluene. 28 ml of a solution of $CH_3MgBr$ (1.4M in toluene/THF) are added dropwise to the suspension over a period of 15 minutes. The reaction mixture is stirred at 70° C. for 2 hours. All insoluble constituents are subsequently filtered off hot and the residue is washed with 6×100 ml of warm toluene. The clear, yellow-orange solution obtained is ready for direct use in further reactions.

The $^1$H-NMR spectrum of an evaporated sample displays only signals of compound B.

$^1$H-NMR in $CDCl_3$:−0.90 s (6H, Zr—CH3); 0.90 s (6H, Si—CH3); 1.98 s (6H, Cp—CH3), 6.6 s (2H, Cp); 6.7–7.5 m (16 H, C12H8)

For the activation, the solution obtained above is cooled to 0° C. and subsequently admixed with 18.4 g (20 mmol) of triethylammonium tetrakispentafluorophenylborate. The mixture is stirred for another 20 minutes and the solution is allowed to warm to room temperature, giving a clear, dark red solution.

EXAMPLE 3

Preparation of dimethylsilylbis(2-methyl-4-naphthylindenyl)dimethyl-zirconium (Compound C)

14.62 g (20 mmol) of dimethylsilylbis(2-methyl-4-naphthylindenyl)-zirconium dichloride are suspended in 300 ml of xylene. 28 ml of a solution of $CH_3MgBr$ (1.4M in toluene/THF) are added dropwise to the suspension over a period of 15 minutes. The reaction mixture is stirred at 70° C. for 2 hours. All insoluble constituents are subsequently filtered off hot and the residue is washed with 6×100 ml of warm xylene. The clear, yellow solution obtained is ready for direct use in further reactions.

The $^1$H-NMR spectrum of an evaporated sample displays only signals of compound C.

$^1$H-NMR in $CDCl_3$:−1.10 s (6H, Zr—CH3); 1.15 s (6H, Si—CH3); 2.10 s (6H, Cp—CH3), 6.7 s (2H, Cp); 6.9–8.0 m (20 H, C12H8)

For the activation, the solution obtained above is cooled to 0° C. and subsequently admixed with 18.4 g (20 mmol) of triethylammonium tetrakispentafluorophenylborate. The mixture is stirred for another 20 minutes and the solution is allowed to warm to room temperature, giving a clear, red solution.

EXAMPLE 4

Preparation of dimethylsilylbis(2-methyl4,5-benzindenyl)dimethylzirconium (Compound D)

11.5 g (20 mmol) of dimethylsilylbis(2-methyl4,5-benzindenyl)zirconium dichloride are suspended in 200 ml of xylene. 28 ml of a solution of $CH_3MgBr$ (1.4M in toluene/THF) are added dropwise to the suspension over a period of 15 minutes. The reaction mixture is stirred at 70° C. for 2 hours. All insoluble constituents are subsequently filtered off hot and the residue is washed with 6×100 ml of warm xylene. The clear, yellow solution obtained is ready for direct use in further reactions.

The $^1$H-NMR spectrum of an evaporated sample displays only signals of compound D.

$^1$H-NMR in $CDCl_3$:−1.80 s (6H, Zr—CH3); 0.92 s (6H, Si—CH3); 1.98 s (6H, Cp—CH3), 7.0 s (2H, Cp); 7.1–7.8 m (12 H, C12H8)

For the activation, the solution obtained above is cooled to 0° C. and subsequently admixed with 16 g (20 mmol) of N,N-dimethylanilinium tetrakispentafluorophenylborate. The mixture is stirred for another 20 minutes and the solution is allowed to warm to room temperature, giving a clear, dark red solution.

EXAMPLE 5

9.55 g (20 mmol) of dimethylsilylbis(2-methylindenyl) zirconium dichloride are suspended in 150 ml of toluene. 28 ml of a solution of $CH_3MgBr$ (1.4 M in toluene/THF) are added dropwise to the suspension over a period of 15 minutes. The reaction mixture is stirred at 70° C. for 2 hours. All insoluble constituents are subsequently filtered off hot and the residue is washed with 6×100 ml of warm toluene. The clear, yellow-orange solution (A) obtained is ready for direct use in further reactions.

5 g of $SiO_2$ (MS 3030, from PQ, dried at 200° C. in a stream of argon) are stirred in 50 ml of pentane and admixed at −40° C. with 10 ml of n-butyllithium (2.5M in hexane). The suspension is allowed to come to room temperature quickly and is stirred for another 2 hours. 5.1 g of trispentafluorophenylbenzene are subsequently added and the resulting suspension is stirred at 40° C. for 4 hours. The suspension is allowed to cool to room temperature and 1.6 g of N,N-dimethylanilinium hydrochloride are added a little at a time. The suspension is stirred for 8 hours, subsequently filtered and the residue is dried under reduced pressure. The solid obtained is suspended in 100 ml of toluene and slowly admixed with solution (A). The dark red suspension formed is stirred for another 30 minutes and subsequently filtered. The red residue is washed with 4×40 ml of toluene and then dried under reduced pressure.

EXAMPLE 6

Preparation of dimethylsilylbis(indenyl)dimethylzirconium (Compound F)

9 g (20 mmol) of dimethylsilylbis(indenyl)zirconium dichloride are suspended in 300 ml of toluene. 25 ml of methyllithium (1.4M in dimethyl ether) are added dropwise at 0° C. to the suspension. The reaction mixture is stirred for 1 hour at 40° C. and for another 2 hours at room temperature. All insoluble constituents are subsequently filtered off and the residue is washed with 3×100 ml of toluene. The clear, orange solution (F) obtained is ready for direct use in further reactions.

The $^1$H-NMR spectrum of an evaporated sample displays only signals of compound F.

$^1$H-NMR in $C_6D_6$: −1.05 s (6H, Zr—$CH_3$); 0.60 s (6H, Si—$CH_3$); 5.85 d (2H, Cp); 6.65 d (2H, Cp); 6.8–7.5 m (8 H, $C_6H$)

For the activation, the solution obtained above is cooled to 0° C. and subsequently admixed with 16 g (20 mmol) of N,N-dimethylanilinium tetrakispentafluorophenylborate. The mixture is stirred for another 20 minutes and the solution is allowed to warm to room temperature, giving a clear, red solution.

EXAMPLE 7

Preparation of tert-butylamido(tetramethyl-η5-cyclopentadienyl)dimethylsilyl-dimethyltitanium (Compound G)

3.4 g (10 mmol) of tert-butylamido(tetramethyl-η5-cyclopentadienyl)dimethylsilyltitanium dichloride are suspended in 200 ml of tetrahydrofuran and cooled to 0° C. 14 ml of a solution of $CH_3MgBr$ (1.4M in toluene/THF) is rapidly added dropwise to the suspension. The reaction mixture is stirred for 2 hours at room temperature and subsequently for 1 hour at 50° C. All insoluble constituents are filtered off and the residue is washed with 3×100 ml of toluene. The clear, pale yellow solution (G) obtained is ready for direct use in further reactions.

The $^1$H-NMR spectrum of an evaporated sample displays only signals of compound G.

$^1$H-NMR in $C_6D_6$: −0.05 s (6H, Zr—$CH_3$); 0.45 s (9H, N—$C(CH_3)_3$); 1.40 s (6H, Si—$CH_3$); 1.90 s (6H, Cp—$CH_3$); 1.96 s (6H, Cp—$CH_3$)

For the activation, the solution obtained above is cooled to 0° C. and subsequently admixed with 5.1 g (10 mmol) of trispentafluorophenylborane. The mixture is stirred for another 20 minutes and the solution is allowed to warm to room temperature, giving a turbid, orange suspension.

EXAMPLE 8

Preparation of bis(2,3-dimethylcyclopentadienyl) dimethylzirconium (Compound H)

7 g (20 mmol) of bis(2,3-dimethylcyclopentadienyl) zirconium dichloride are dissolved in 100 ml of toluene. At room temperature, 28 ml of $CH_3MgBr$ (1.4M in toluene/THF) are quickly added dropwise to the above solution. The reaction mixture is stirred at 70° C. for 2 hours. All insoluble constituents are subsequently filtered off hot and the residue is washed with 3×100 ml of warm toluene. The clear, pale yellow solution (H) obtained is ready for direct use in further reactions.

The $^1$H-NMR spectrum of an evaporated sample displays only signals of compound H.

$^1$H-NMR in $C_6D_6$: −0.6 s (6H, Zr—$CH_3$); 1.2 s (6H, Cp—$CH_3$); 1.5 s (6H, Cp—$CH_3$); 4.8 t (2H, Cp—H); 5.2 t (2H, Cp—H); 5.5 t (2H, Cp—H)

For the activation, the solution obtained above is cooled to 0° C. and subsequently admixed with 16 g (20 mmol) of N,N-dimethylanilinium tetrakispentafluorophenylborate. The mixture is stirred for another 20 minutes and the solution is allowed to warm to room temperature, giving a clear, red solution.

EXAMPLE 9

Preparation of [4-($\eta^5$-3'-trimethylsilylcyclopentadienyl) 4,6,6-trimethyl($\eta^5$-4,5-tetrahydropentalene)] dimethylzirconium (Compound I)

4.4 g (10 mmol) of [4-($\eta^5$-3'-trimethylsilylcyclopentadienyl)-4,6,6-trimethyl($\eta^5$-4,5-tetrahydropentalene)]zirconium dichloride are suspended in 100 ml of toluene. 14 ml of a solution of CH3MgBr (1.4M in toluene/THF) are added dropwise to this suspension over a period of 30 minutes. The reaction mixture is stirred for 1 hour at room temperature and for 1 hour at 70° C. All insoluble constituents are subsequently filtered off hot and the residue is washed with 3×100 ml of toluene. The clear, orange solution (I) obtained is ready for direct use in further reactions.

The $^1$ H-NMR spectrum of an evaporated sample displays only signals of compound I.

$^1$H—NMR $CDCl_3$: 7.0-5.2 (m, 6H, H—C(2'), H—C(4'), H—C(5'), H—C(1), H—C(2), H—C(3)); 2.7 (m, 14, 1H, H—C(5)), 2.45 (m, 14, 1H, H—C(5)); 2.2 (m, 3H, $CH_3$); 1.8 (m, 3H, $CH_3$); 1.30 (m, 6H, $CH_3$); 0.20 (s, $CH_3$—Si); 0.19 (s, $CH_3$—Si); −0.45 (s, Zr—$CH_3$)

EXAMPLE 10

Activation of compound A with simultaneous application to a support 25 g of $SiO_2$ (MS 3030, from PQ, dried at 200° C. in a stream of argon) are suspended in 100 ml of pentane and admixed at 40° C. with 0.4 ml of n-butyllithium (2.5 M in hexane). The suspension is allowed to come quickly to room temperature and is stirred for another 2 hours. 0.5 g of trispentafluorophenylbenzene is subsequently added and the resulting suspension is stirred at 40° C. for 2 hours. The suspension is allowed to cool to room temperature and 0.16 g of N,N-dimethylanilinium hydrochloride is added at a little at a time. The suspension is stirred for 4 hours, subsequently filtered and the residue is dried under reduced pressure. The solid obtained is suspended in 100 ml of toluene and slowly admixed with 46 ml of solution (A). The resulting red suspension is stirred for another 30 minutes and subsequently filtered. The pale red residue is washed with 4×100 ml of toluene and then dried in an oil pump vacuum. For introduction into the polymerization system, 1 g of the supported catalyst is resuspended in 30 ml of Exxsol®.

Polymerization:

In parallel thereto, a dry 16 l reactor was flushed first with nitrogen and subsequently with propylene and was charged with 10 l of liquid propylene. 0.5 ml of a 20% strength triisobutylaluminum solution in Varsol diluted with 30 ml of Exxsol were introduced into the reactor and the mixture was stirred at 30° C. for 15 minutes.

The catalyst suspension was subsequently introduced into the reactor. The reaction mixture was heated to the polymerization temperature of 60° C. (4° C./min) and the polymerization system was held at 60° C. for 1 hour by means of cooling. The polymerization was stopped by venting the remaining propylene. The polymer was dried in a vacuum drying oven. The reactor displayed no deposits on the inner wall or stirrer. The catalyst activity was 126 kg of PP/g of metallocene×h.

EXAMPLE 11

Application of the activated compound B to a support 15 g of $SiO_2$ (MS 3030, from PQ, dried at 800° C. in a stream of argon) were suspended in 60 ml of toluene and, while stirring, 23 ml of the solution C activated with triethylammonium tetrakispentafluorophenylborate, as obtained in Example 3, are slowly added dropwise. The mixture is stirred for 1 hour at room temperature and the solvent is then removed in an oil pump vacuum until the weight is constant. For introduction into the polymerization system, 1 g of the supported catalyst is resuspended in 30 ml of Exxsol®.

Polymerization:

In parallel thereto, a dry 16 l reactor was flushed first with nitrogen and subsequently with propylene and was charged with 10 l of liquid propylene. 0.5 ml of a 20% strength triisobutylaluminum solution in Varsol diluted with 30 ml of Exxsol was then introduced into the reactor and the mixture was stirred at 30° C. for 15 minutes.

The catalyst suspension was then introduced into the reactor. The reaction mixture was heated to the polymerization temperature of 60° C. (4° C./min) and the polymerization system was held at 60° C. for 1 hour by means of cooling. The polymerization was stopped by venting the remaining propylene. The polymer was dried in a vacuum drying oven.

The reactor displayed no deposits on the internal wall or stirrer. The catalyst activity was 112 kg of PP/g of metallocene×h.

EXAMPLE 12

Preparation of dimethylsilylbis(2-methylindenyl) dimethylzirconium (Compound B)

9.55 g (20 mmol) of dimethylsilylbis(2-methylindenyl) zirconium dichloride are suspended in 150 ml of toluene. 28 ml of a solution of $CH_3MgBr$ (1.4M in toluene/THF) are added dropwise to the suspension over a period of 15 minutes. The reaction mixture is stirred at 70° C. for 2 hours. All insoluble constituents are subsequently filtered off hot and the residue is washed with 6×100 ml of warm toluene. The clear, yellow-orange solution (B) obtained is ready for direct use in further reactions.

The $^1$H-NMR spectrum of an evaporated sample displays only signals of compound B.

$^1$H-NMR in CDCl$_3$: −0.90 S (6H, Zr—CH$_3$); 0.90 s (6H, Si—CH$_3$); 1.98 s (6H, Cp—CH$_3$), 6.6 s (2H, Cp); 6.7–7.5 m (16H, C$_{12}$H$_8$).

For the activation, the solution obtained above is cooled to 0° C. and subsequently admixed with 14.2 g (10 mmol) of bis(N,N-dimethylanilinium)-1,4-bis[tris(pentafluorophenyl)boryl]-2,3,5,6-tetrafluorobenzene. The mixture is stirred for another 20 minutes and the solution is allowed to warm to room temperature, giving a clear, dark red solution.

EXAMPLE 13
Preparation of rac-dimethylsilylbis(indenyl)dimethylhafnium (Compound J)

10.7 g (20 mmol) of rac-dimethylsilylbis(indenyl)hafnium dichloride are suspended in 200 ml of toluene. 28 ml of a solution of CH$_3$MgBr (1.4M in toluene/THF) is added dropwise to the suspension over a period of 15 minutes. The reaction mixture is stirred at 70° C. for 1 hour. All insoluble constituents are subsequently filtered off hot and the residue is washed with 5×100 ml of warm toluene. The clear, yellow solution (J) obtained is ready for direct use in further reactions.

The $^1$H-NMR spectrum of an evaporated sample displays only signals of compound J.

$^1$H-NMR in CDDl$_3$: −1.70 s (6H, Zr—CH$_3$); 0.90 s (6H, Si—CH$_3$); 5.9 d (2H, Cp); 6.6 (2H, Cp); 6.8–7.6 m (8H, C$_6$H$_4$)

For the activation, the solution obtained above is cooled to 0° C. and subsequently admixed with 16 g (20 mmol) of N,N-dimethylanilinium tetrakispentafluorophenylborate. The mixture is stirred for another 20 minutes and the solution is allowed to warm to room temperature, giving a clear, dark red solution.

What is claimed is:

1. A process for preparing a metallocene catalyst composition, which comprises reacting a metallocene starting compound in a solvent with a compound selected from the group consisting of organolithium compounds and Grignard compounds wherein the stoichiometric ratio of the metallocene starting compound and the compound selected from the group consisting of arganolithium compounds and Grignard compounds is from 1:0.1 to 1:20, th. reaction temperature is from 40° C. to 100° C. and the reaction time is from 5 minutes to 24 hours and converting the resulting metallocene compound which is σ-substituted by one or more hydrocarbon radicals in solution, without isolation, into a polymerization-active catalyst composition by means of an activator and subsequently contacting the polymerization-active catalyst composition with a support, or by means of an activator which is covalently bound to a support.

2. A process as claimed in claim 1, wherein the stoichiometric ratio of the metallocene starting compound and the compound selected from the group consisting of methyllithium and Grignard compounds is from 1:0.3 to 1:2.

3. The process as claimed in claim 1, wherein the solvent is an organic solvent.

4. The process as claimed in claim 1, wherein the metallocene starting compound is a cyclopentadienyl complex.

5. The process as claimed in claim 1, wherein the activator is a strong uncharged Lewis acid, an ionic compound containing Lewis acid cations or an ionic compound containing a Brönsted acid as cations.

6. A process as claimed in claim 1, wherein the Grignard compound is a methylmagnesium halide or a benzylmagnesium halide.

7. A process as claimed in claim 6, wherein the Grignard compound is methylmagnesium chloride, methylmagnesium bromide, benzylmagnesium chloride or benzylmagnesium bromide.

8. The process as claimed in claim 3, wherein said organic solvent dissolves, in whole or in part, said metallocene starting compound or said polymerization-active catalyst composition.

9. The process as claimed in claim 3, wherein said organic solvent comprises a suspension medium.

10. A process as claimed in claim 1, wherein the stoichiometric ratio of the metallocene starting compound and the compound selected from the group consisting of methyllithium and Grignard compounds is from 1:0.3 to 1:2.5.

11. A process for preparing a catalyst composition containing a metallocene, which process comprises:

reacting, in a reaction mixture, the components comprising:

a) a metallocene of formula (I)

$$\text{(substituted or unsubstituted cyclopentadienyl)} \diagdown \atop (Z)_v \diagup \diagdown \atop \text{(substituted or unsubstituted cyclopentadienyl)}, \diagup M^1X^1_o \quad \text{(I)}$$

wherein:

the substituted or unsubstituted cyclopentadienyl groups are the same or different, Z is a bridging structural element between the cyclopentadienyl rings of the substituted or unsubstituted cyclopentadienyl groups, v is zero or 1, M$^1$ is a metal of transition group 3, 4, 5 or 6 of the Periodic Table of the Elements, X$^1$ is halogen, o is a number from 1 to 4, dissolved, suspended, or dissolved and suspended in an organic solvent medium, and b) a compound of the formula II $$M^2R^{20}_qX^1_r \quad \text{(II)}$$

wherein:

M$^2$ is a metal of main group 1, 2, 13 or 14 or transition group 11, 12, 3 or 4 of the Periodic Table of the Elements, the radicals R$^{20}$ are the same or different and are each a hydrocarbon radical having 1 to 20 carbon atoms, and X$^1$ is a halogen which is the same or different as the halogen of compound I, q is a number from 1 to 6, and r is a number from zero to 6, to obtain, in said reaction mixture, a metallocene of the formula III

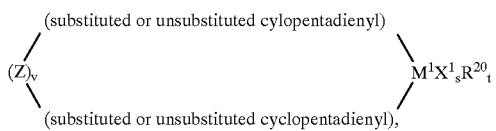

(III)

wherein:

Z, v, $M^1$, $X^1$ and $R^{20}$ are as defined above, s is a number from zero to 4 and t is a number from 1 to 4, and reacting said compound of formula III, without isolating it from said reaction mixture, with an activator which comprises an acidic compound, to obtain an activated metallocene-containing catalyst compositions.

12. The process as claimed in claim 11, wherein at least one said cyclopentadienyl radical is substituted with two or more substituents, and wherein the substituents are connected to form a substituted or unsubstituted $C_4$–$C_{24}$ ring.

13. The process as claimed in claim 12, wherein said cyclopentadienyl radical is substituted with substituents which, in combination with the cyclopentadienyl radical, form a substituted or unsubstituted indenyl radical.

14. The process as claimed in claim 11 wherein $M^1$ is a metal of transition Group 4 of the Periodic Table of the Elements, and $M^2$ is a metal of main Group 1, 2, or 13 of the Periodic Table of the Elements.

15. The process as claimed in claim 11, wherein the reaction mixture, after forming said formula III, is filtered to remove any insoluble byproducts, and an additional amount of an organic solvent medium is added, prior to reacting said compound of formula III with the activator.

16. The process as claimed in claimed 11, wherein said activated metallocene-containing catalyst composition includes a support material.

17. The process as claimed in claim 16, wherein said activator is covalently bound to said support material before it is added to said reaction mixture.

18. The process as claimed in claim 11, wherein said acidic compound is an uncharged Lewis acid, an ionic compound containing at least one cation which is a Lewis acid or an ionic compound containing at least one cation which is a Brönsted acid.

19. The process as claimed in claim 11, wherein said organic solvent medium is a hydrocarbon, an ether, or a mixture thereof.

* * * * *